United States Patent
Itoh et al.

(10) Patent No.: US 7,899,331 B2
(45) Date of Patent: Mar. 1, 2011

(54) WDM OPTICAL TRANSMISSION SYSTEM AND OPTICAL AMPLIFYING APPARATUS

(75) Inventors: Hiroyuki Itoh, Kawasaki (JP); Kosuke Komaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 803 days.

(21) Appl. No.: 11/882,094

(22) Filed: Jul. 30, 2007

(65) Prior Publication Data

US 2008/0080867 A1 Apr. 3, 2008

(30) Foreign Application Priority Data

Sep. 28, 2006 (JP) .............................. 2006-263961

(51) Int. Cl.
 *H04J 14/02* (2006.01)
(52) U.S. Cl. .............................. 398/97; 398/79; 398/94; 359/337.1; 359/337.12; 359/341.41; 359/341.42
(58) Field of Classification Search .................. 398/79, 398/94; 359/337.1, 337.12, 341.41, 341.42
See application file for complete search history.

(56) References Cited

U.S. PATENT DOCUMENTS

| 6,038,063 | A  | * | 3/2000  | Tsuda et al. ............ 359/341.41 |
| 6,282,017 | B1 | * | 8/2001  | Kinoshita ............... 359/341.42 |
| 6,377,394 | B1 | * | 4/2002  | Drake et al. ............ 359/341.41 |
| 6,449,070 | B1 | * | 9/2002  | Izumi ........................... 398/79 |
| 6,466,348 | B1 | * | 10/2002 | Izumi ......................... 398/177 |
| 6,590,700 | B1 | * | 7/2003  | Seydnejad et al. ....... 359/341.4 |
| 6,975,449 | B1 | * | 12/2005 | Mok et al. ............... 359/341.41 |
| 7,006,279 | B2 | * | 2/2006  | Liu et al. .................. 359/337.1 |
| 7,042,634 | B2 | * | 5/2006  | Aozasa et al. .......... 359/341.41 |
| 7,308,208 | B2 | * | 12/2007 | Watanabe .................... 398/177 |
| 7,538,937 | B2 | * | 5/2009  | Aozasa et al. .......... 359/341.41 |
| 7,606,488 | B2 | * | 10/2009 | Sugaya ........................ 398/34 |
| 7,689,131 | B2 | * | 3/2010  | Uekama et al. ............. 398/181 |
| 2006/0203329 | A1 | * | 9/2006 | Nishihara et al. ........... 359/337 |
| 2006/0216028 | A1 | * | 9/2006 | Ozawa ......................... 398/79 |
| 2008/0068700 | A1 | * | 3/2008 | Kawahara et al. ........... 359/333 |

FOREIGN PATENT DOCUMENTS

JP     11-261490     9/1999

\* cited by examiner

*Primary Examiner*—Ken N Vanderpuye
*Assistant Examiner*—Tanya Ngo
(74) *Attorney, Agent, or Firm*—Fujitsu Patent Center

(57) ABSTRACT

According to a WDM optical transmission system of the present invention, wavelength numbers information of a WDM signal light output from an upstream side optical amplifying unit to a transmission path fiber, and signal output level information thereof are transmitted to a downstream side optical amplifying unit utilizing a supervisory control light. In the downstream side optical amplifying unit, a loss (span loss) in the transmission path fiber is computed using the upstream side signal output level information and downstream side signal input level information, so that a gain to be set for a downstream side optical amplifier is calculated based on the computed loss, and also, the gain is corrected based on a difference between a target value of the signal output level computed using the wavelength numbers information and an actual measurement value thereof, so that the optical amplifier is controlled in accordance with the post-corrected gain. As a result, it becomes possible to reduce an influence by a measurement error of the span loss, to thereby control the optical amplifier at a high-speed and with high precision.

10 Claims, 7 Drawing Sheets

WDM OPTICAL TRANSMISSION SYSTEM AND OPTICAL AMPLIFYING APPARATUS

BACKGROUND OF THE INVENTION

1. Field of the Invention

The present invention relates to a WDM optical transmission system which transmits a wavelength division multiplexed (WDM) light while amplifying it, and an optical amplifying apparatus, and in particular, to a WDM optical transmission system and an optical amplifying apparatus, in which the optical amplification is controlled so that a signal output level is held constant.

2. Description of the Related Art

In the case where an optical amplifier is used in a WDM optical transmission system, as methods of controlling an optical amplification operation of the optical amplifier, there have been known an automatic gain control (AGC) and an automatic level control (ALC). The automatic gain control is a method of setting a gain according to a transmission path loss at the time of device setting-up, and thereafter, continuing to hold the set gain. Further, the automatic level control is a method of setting a gain according to a transmission path loss at the time of device setting-up, and thereafter, variably controlling the set gain based on wavelength numbers information on a WDM signal light being transmitted, so that the total signal output level of the optical amplifier is held constant.

However, in the above automatic gain control, there is a problem in that an output signal level of the optical amplifier is varied due to a change in the transmission path loss. For example, a loss of a transmission path fiber (transmission path loss) is changed due to the temperature. Further, there is also a possibility that stress, such as bending or the like, is subjected to the transmission path fiber for some reason, and therefore, the transmission path fiber loss is changed. If the automatic gain control is performed under such a condition, there is a possibility that the output signal level of the optical amplifier is varied according to the change in the transmission path loss, to be deviated from an optimum signal level, from a standpoint of signal reception sensitivity.

Further, in the above automatic level control, there is a problem in that the signal level variation occurs since it requires substantial time to obtain the wavelength numbers information on the WDM signal light. Namely, in order to realize the automatic level control, it is necessary to obtain information on "the number of wavelengths" of the WDM signal light which is currently being amplified by the optical amplifier. This is because, in the automatic level control, the gain of the optical amplifier is variably controlled, with the total signal level obtained by multiplying the signal level per one wavelength by the number of wavelengths as a target value. In order to detect the number of wavelengths of the WDM signal light in which a plurality of optical signals of different wavelengths are bundled, a detecting section that measures a level per one wavelength to detect the presence or absence of an optical signal is present needs to be disposed.

In the meantime, as shown in FIG. 4 for example, the number of wavelengths of the WDM signal light which is fed to an optical amplifier on the WDM optical transmission system is also arbitrarily changed during communication service operation, by applying an optical transmission apparatus, for example an optical add drop multiplexer (OADM), which is provided with a multiplexer/demultiplexer or the like on the upstream side of this optical amplifier. Accordingly, in the optical amplifier for WDM light transmission, in order to cope with the change in the number of wavelengths of the WDM signal light, a high-speed automatic gain control is usually performed.

The method in which only this high-speed automatic gain control is performed corresponds to the above described "automatic gain control", and "automatic level control" is for performing the automatic level control using the wavelength numbers information, in addition to this high-speed automatic gain control.

As described in the above, in the automatic level control using the wavelength numbers information, since the high-speed automatic gain control is performed simultaneously with the automatic level control, there is a relation, as typically shown in FIG. 5 for example, between a control speed for holding the signal level constant and a detecting time of the number of wavelengths to be used for the automatic level control. Namely, in the case where the detecting time is longer than the control speed, although the number of wavelengths is actually changed during a period of time until the variation of the number of wavelengths is detected after the number of wavelengths of the WDM signal light is varied at the time t0 and the total input power is changed, an erroneous automatic level control is performed so that the total output power approaches a level corresponding to the number of wavelengths before changed (refer to the broken line in the lower stage of FIG. 5). Then, at the time t1 where the variation of the number of wavelengths is detected in the detecting section and information thereof is transmitted to the optical amplifier, such an erroneous automatic level control which has been performed until that moment is suspended and the automatic level control for achieving the total output power according to the post-varied number of wavelengths is performed. Therefore, the level variation ΔP is caused in the total output power. In other words, there is the necessity to set the control speed for the automatic level control to be lower, so that the level variation ΔP reaches minimum.

From the above relation, there is no problem for example in the case where the automatic level control of low control speed for absorbing the low-speed variation, such as the temperature variation of the transmission path loss, is performed. However, in the case where stress, such as bending or the like, is subjected to the transmission path fiber, when the signal level of output light is led-in in a moment of time (for example, in millisecond (ms) order) by the automatic level control, there is the necessity to speed up the detecting time of the number of wavelengths.

Namely, in order to cope with the instantaneous signal level variation, such as the bending or the like in the transmission path fiber, it becomes necessary to perform the high-speed automatic level control, and also, in order to reduce ΔP at the variation time of the number of wavelengths, it is necessary to transmit the wavelength numbers information at a high speed, so that the automatic level control is suspended and the automatic gain control is performed.

However, in the detection of the number of wavelengths, due to constraints and the like on a detecting device, there may be the problematic case where the speeding-up of detecting time is difficult. Consequently, in practice, it is difficult to approach ΔP to 0, and accordingly, the detecting device is designed such that the level variation of certain degree is allowed at the variation time of the number of wavelengths.

To cope with such a problem, as the automatic level control which does not need the speeding-up in the detection of the number of wavelengths, there has been proposed a method in which a loss (span loss) in a transmission span to a former-staged adjacent repeating device is always monitored, and the output signal level of the optical amplifier is controlled to be constant according to a monitoring result of the transmission pass loss (to be referred hereunder as "automatic level control by the span loss monitoring) (refer to Japanese Unexamined Patent Publication No. 11-261490).

FIG. 6 shows a configuration example of an essential part of a WDM optical transmission system applied with the automatic level control by the span loss monitoring. In this configuration example, a signal output level of an optical amplifier 111 which is disposed in an optical amplifying unit 110 positioned on the upstream side of the system is detected by an output monitor 112, and signal output level information thereof is transmitted from a control circuit 113 to a supervisory control light (optical supervisory channel (OSC)) transmitter 114. Then, a supervisory control light containing the signal output level information is generated by the OSC transmitter 114, and is multiplexed with a WDM signal light by a multiplexer 115 to be output to a transmission path fiber 101, and then, is transmitted over the transmission path fiber 101 toward an optical amplifying unit 130 on the downstream side of the system. In the optical amplifying unit 130, the light transmitted over the transmission path fiber 101 is demultiplexed by a demultiplexer 132 into the WDM signal light and the supervisory control light, so that the signal output level information of the optical amplifying unit 110, which is contained in the supervisory control light, is detected by an OSC receiver 134 and also a signal input level of the WDM signal light to be fed to an optical amplifier 131 is detected by an input monitor 133, and then, detection results in the OSC receiver 134 and the input monitor 133 are transmitted respectively to a control circuit 135. Then, in the control circuit 135, a span loss in the transmission path fiber 101 is calculated using the signal output level on the upstream side and the signal input level on the downstream side, and a gain of the optical amplifier 131 is set based on the span loss, so that the automatic level control for the WDM signal light output from the optical amplifier 131 is performed.

In the automatic level control by the span loss monitoring as described in the above, since the detection of the number of wavelengths as described above is not performed, the automatic level control can be performed at a high control speed of millisecond order. As a result, it becomes possible to suppress the variation of signal output level of the optical amplifier to be less, even in the case where the span loss is varied at a high-speed.

To be specific, the comparison will be made between the automatic level control using the above described wavelength numbers information and the automatic level control by the span loss monitoring. For example, in the case where the span loss is varied at a high-speed as a result that the transmission path fiber is swung, a signal input waveform to the optical amplifier arranged on the downstream of the transmission path fiber is significantly varied during a period of time from the variation of span loss occurs at the time T0 until the variation of span loss is ended at the time T1, as shown in the upper stage of FIG. 7 for example. In such a case, if the automatic level control using the wavelength numbers information is applied to this optical amplifier, since it is necessary to set the speed of the automatic level control to be sufficiently lower than the detecting time of the number of wavelengths, a signal output waveform from the optical amplifier is in the form in which the variation of the signal input level is represented just as it is, as shown in the middle stage of FIG. 7 for example.

On the other hand, if the automatic level control by the span loss monitoring is applied to the optical amplifier, since the high-speed automatic level control of millisecond order can be performed, the signal output waveform from the optical amplifier is in the form in which the variation of the signal input level is suppressed, as shown in the lower stage of FIG. 7 for example. Accordingly, in the automatic level control by the span loss monitoring, it becomes possible to hold an optimum signal level from the standpoint of signal reception sensitivity.

However, in the optical amplifier to which the automatic level control by the span loss monitoring as described above is applied, there is a problem in that a measurement error of the span loss is directly linked to a setting error of the signal output level. Further, as shown in FIG. 8 for example, in the case where optical amplifying units 201 to 203 to each of which the automatic level control by the span loss monitoring is applied, are connected in multi-stages via transmission path fibers 211 to 213, there is a problem in that a measurement error of the span loss in each optical amplifying unit is accumulated. To be specific, for example, when actual span losses in the transmission path fibers 211, 212 and 213 among first to third repeating sections are 22 dB, 25 dB and 23 dB, if the span losses calculated in the respective optical amplifying units 201, 202 and 203 are 21.5 dB, 24.5 dB and 22.5 dB, an error of −0.5 dB occurs in a target value of the signal output level, which is set in each of the optical amplifying units 201, 202 and 203. Therefore, in the signal light after sequentially passed through the three-staged optical amplifying units 201, 202 and 203, the level reduction of 1.5 dB occurs.

SUMMARY OF THE INVENTION

The present invention has been accomplished in view of the above problems and has an object to provide a WDM optical transmission system and an optical amplifying apparatus, capable of reducing an influence due to a measurement error of a span loss and of controlling the optical amplification at a high-speed and with high precision, while taking advantage of an automatic level control by the span loss monitoring.

In order to achieve the above object, a WDM optical transmission system of the present invention which includes: a first optical amplifying section that amplifies a WDM signal light in which a plurality of optical signals of different wavelengths are multiplexed; an optical transmission path to which the WDM signal light amplified by the first optical amplifying section is input at one end thereof; and a second optical amplifying section that amplifies the WDM signal light output from the other end of the optical transmission path, comprises a wavelength numbers detecting section that detects the number of wavelengths of the WDM signal light input to the first optical amplifying section, to create wavelength numbers information. Further, the first optical amplifying section includes: a first optical amplifier which amplifies the WDM signal light input thereto; a first signal output monitor which detects the total power of the WDM signal light output from the first optical amplifier, to create first signal output level information; a supervisory control light transmitter which transmits a supervisory control light containing the wavelength numbers information created by the wavelength numbers detecting section and the first signal output level information created by the first signal output monitor; and a multiplexer which multiplexes the WDM signal light amplified by the first optical amplifier with the supervisory control light transmitted from the supervisory control light transmitter, to feed the multiplexed light to the one end of the optical transmission path. Furthermore, the second optical amplifying section includes: a demultiplexer which demultiplexes the light output from the other end of the optical transmission path into the WDM signal light and the supervisory control light; a second optical amplifier which amplifies the WDM signal light demultiplexed by the demultiplexer; a signal input monitor which detects the total power of the WDM signal light input to the second optical amplifier, to create signal input level information; a second signal output monitor which detects the total power of the WDM signal light output from the second optical amplifier, to create second signal output level information; a supervisory control light receiver which receives the supervisory control light demultiplexed by the demultiplexer, to acquire the wavelength numbers information and the first signal output level information; and a control circuit which computes a loss in the optical transmission path using the first signal output level information acquired in the supervisory control light receiver and the signal input level information created by the signal input monitor, to calculate a gain to be set for the second optical amplifier based on the computed loss, and also computes a target signal output level of the second optical amplifier using the wavelength numbers information acquired in the supervisory control light receiver, to correct the computed gain using a difference between the target signal output level and the second signal output level information created by the second signal output monitor as a correction value, to thereby control the second optical amplifier in accordance with the corrected gain.

In the WDM optical transmission system of the above configuration, the wavelength numbers information and first signal output level information of the WDM signal light output from the upstream side first optical amplifying section to the optical transmission path are transmitted to the downstream side second optical amplifying section utilizing the supervisory control light. In the second optical amplifying section, the control circuit computes the loss (span loss) in the optical transmission path using the total output power of the WDM signal light on the upstream side, which is indicated in the first signal output level information, and the total input power of the WDM signal light on the downstream side, which is detected by the signal input monitor, to calculate the gain to be set for the second optical amplifier based on the computed loss. Further, the target signal output level of the second optical amplifier is computed using the wavelength numbers information of the WDM signal light, and the difference between the computed target signal output level and the signal output level detected by the second signal output monitor is computed. Since the gain calculated based on the span loss contains a measurement error of the span loss, such an error is corrected based on a difference between the target value of the signal output level computed using the wavelength numbers information and an actual measurement value thereof, so that the second optical amplifier is controlled in accordance with the gain after corrected. The correction using the wavelength numbers information in the above control is performed only for correcting the error, and performance cycles thereof can be set to be long cycles of second order, considering that the error is caused by the temperature, aged variation or the like, although depending on causes of such an error.

According to the WDM optical transmission system of the present invention as described in the above, since a setting error of the gain, which occurs due to the measurement error of the span loss, is compensated by the correction value computed using the wavelength numbers information, even if the span loss in the optical transmission path or the number of wavelengths of the WDM signal light is varied, the optical amplifiers positioned on the upstream and downstream sides of the system can be controlled at high-speeds and with high precision. Therefore, it becomes possible to improve the signal reception sensitivity in the WDM optical transmission system. Further, although the correction using the wavelength numbers information is performed in the system, a control speed (performance cycles) thereof can be made lower as described in the above. In a conventional automatic level control using the wavelength numbers information, in order to suppress the level variation at the time when the span loss is varied at a high-speed, it is necessary to increase a control speed thereof as much as possible, and therefore, the level variation occurs due to a relation to a detecting time of the number of wavelengths. However, in the case where the wavelength numbers information is applied for correcting an error in an automatic level control by the span loss monitoring, the level variation as in the conventional control can also be resolved.

The other objects, features and advantages of the present invention will be apparent from the following description of the embodiments with reference to the accompanying drawings.

DETAILED DESCRIPTION OF THE INVENTION

Figure 1:
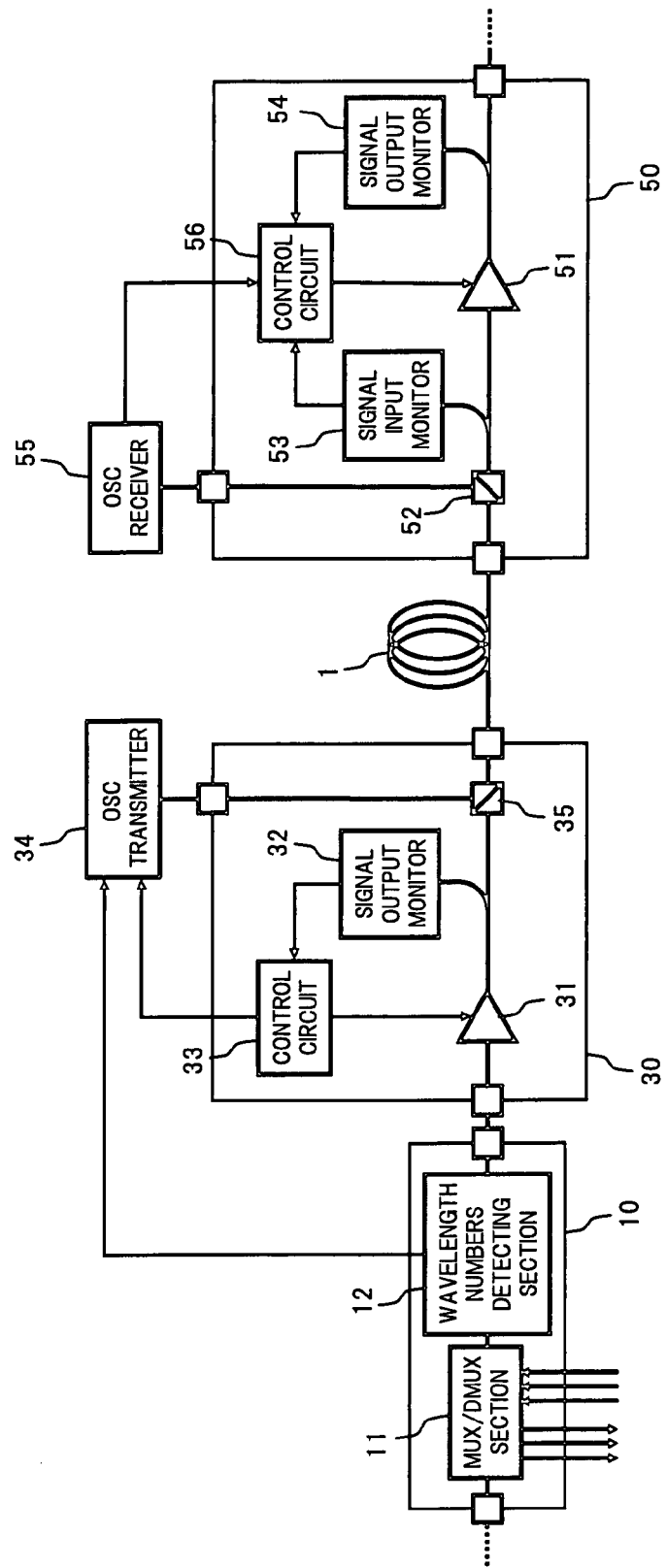
FIG. 1 is a block diagram showing a configuration of an essential part of a WDM optical transmission system according to a first embodiment of the present invention.

Hereinafter, embodiments of the present invention will be described with reference to drawings. The same reference numerals denote the same or equivalent parts in all drawings.

FIG. 1 is a block diagram showing a configuration of an essential part of a WDM optical transmission system using optical amplifiers according to a first embodiment of the present invention.

In FIG. 1, the WDM optical transmission system in the present embodiment comprises, for example: an optical multiplexing/demultiplexing unit 10 which multiplexes/demultiplexes optical signals of desired wavelengths in a WDM signal light to be transmitted over a transmission path fiber 1 serving as an optical transmission path; an optical amplifying unit 30 connected to an output end of the optical multiplexing/demultiplexing unit 10; and an optical amplifying unit 50 to which the WDM signal light output from the optical amplifying unit 30 is input via the transmission path fiber 1. Herein, the optical multiplexing/demultiplexing unit 10 and the optical amplifying unit 30 constitute a part of an optical add-drop multiplexer (OADM) node on the WDM optical transmission system, and the optical amplifying unit 50 constitutes a part of an optical repeater node positioned on the downstream of the OADM node.

The optical multiplexing/demultiplexing unit 10 includes, for example, a multiplexing/demultiplexing (MUX/DMUX) section 11 and a wavelength numbers detecting section 12. The multiplexing/demultiplexing section 11 is for dropping, adding or transmitting optical signals of desired wavelengths among optical signals of a plurality of wavelengths contained in the input WDM signal light, and to be specific, is configured by a combination of devices, such as, an optical switch, a multiplexer, a demultiplexer, a wavelength blocker and the like. The wavelength numbers detecting section 12 is, herein, for detecting the number of wavelengths of the optical signals contained in the WDM signal light output from the multiplexing/demultiplexing section 11. This wavelength numbers detecting section 12 has a configuration basically similar to that of the already described detecting section which is required when the automatic level control using the wavelength numbers information is performed, and to be specific, measures a level per one wavelength of the WDM signal light to detect the presence or absence of the optical signals of respective wavelengths, to thereby judge the number of wavelengths of the WDM signal light, and transmits wavelength numbers information of the WDM signal light to the latter staged optical amplifying unit 30 side. Incidentally, the detecting method of the number of wavelengths of the WDM signal light is not limited to the above described one example, and it is possible to detect the number of wavelengths by applying a known method.

The optical amplifying unit 30 includes, for example, an optical amplifier 31, a signal output monitor 32, a control circuit 33, an OSC transmitter 34 and a multiplexer 35. The optical amplifier 31 is a know optical amplifier capable of receiving the WDM signal light output from the optical multiplexing/demultiplexing unit 10 to amplify collectively the WDM signal light. A gain of this optical amplifier 31 is controlled so that a signal output level thereof per one wavelength is held constant. The signal output monitor 32 branches a part of the WDM signal light output from the optical amplifier 31 and measures the power of the branched light, to thereby monitor the total output power of the optical amplifier 31. A monitoring result in the signal output monitor 32 is transmitted to the control circuit 33. The control circuit 33 performs an automatic level control for the optical amplifier 31 based on signal output level information monitored by the signal output monitor 32, and also, transmits the signal output level information to the OSC transmitter 34. The OSC transmitter 34 generates a supervisory control light containing the wavelength numbers information transmitted from the wavelength numbers detecting section 12 and the signal output level information transmitted from the control circuit 33, to output the supervisory control light to the multiplexer 35. The multiplexer 35 multiplexes the WDM signal light output from the optical amplifier 31 with the supervisory control light output from the OSC transmitter 34, to send out the multiplexed light to the transmission path fiber 1.

The optical amplifying unit 50 includes, for example, an optical amplifier 51, a demultiplexer 52, a signal input monitor 53, a signal output monitor 54, an OSC receiver 55 and a control circuit 56. The optical amplifier 51 is a known optical amplifier capable of receiving the WDM signal light which is sent from the upstream optical amplifying unit 30 via the transmission path fiber 1 and the demultiplexer 52, to amplify collectively the WDM signal light. The demultiplexer 52 demultiplexes the light from the transmission path fiber 1 into the WDM signal light and the supervisory control light, to output the WDM signal light to the optical amplifier 51 while outputting the supervisory control light to the OSC receiver 55. The signal input monitor 53 branches a part of the WDM signal light input to the optical amplifier 51 from the demultiplexer 52 to measure the power of the branched light, to thereby monitor the total input power of the optical amplifier 51. The signal output monitor 54 branches a part of the WDM signal light output from the optical amplifier 51 to measure the power of the branched light, to thereby monitor the total output power of the optical amplifier 51. Monitoring results in the signal input monitor 53 and the signal output monitor 54 are transmitted to the control circuit 56. The OSC receiver 55 receives to process the supervisory control light from the demultiplexer 52, to acquire the wavelength numbers information and signal output level information of the WDM signal light output from the upstream side optical amplifying unit 30, and transmits them to the control circuit 56. The control circuit 56 calculates a span loss in the transmission path fiber 1 using signal input level information from the signal input monitor 53 and the signal output level information from the OSC receiver 55, and also, calculates a target value of the total output power of the optical amplifier 51 using signal output level information from the signal output monitor 54 and the wavelength numbers information from the OSC receiver 55, to thereby perform an automatic level control for the optical amplifier 51 by combining these calculation results. The details of the automatic level control for the optical amplifier 51 by the control circuit 56 will be described later.

Incidentally, in the configuration example shown in FIG. 1, by paying attention to one repeating section on the WDM optical transmission system, the supervisory control light containing the wavelength numbers information and the signal output level information is transmitted from the upstream side optical amplifying unit 30 to be received by the downstream side optical amplifying unit 50, so that, in the downstream side optical amplifying unit 50, the automatic level control by a combination of the wavelength numbers information and the span loss monitoring is performed. However, in the case where a plurality of repeating sections exists on the system, the optical amplifying units on the upstream and downstream sides of each repeating section have respectively functions of transmitting and receiving the supervisory control light, and in each of the optical amplifying units, the automatic level control by the combination of the wavelength numbers information and the span loss monitoring is performed. Further, in FIG. 1, there is shown one example in which the OSC transmitter 34 and the OSC receiver 55 are externally disposed to the optical amplifying units 30 and 50. However, the OSC transmitter 34 and the OSC receiver 55 may be disposed respectively within the optical amplifying units 30 and 50.

Next, there will be described an operation of the first embodiment.

In the WDM optical transmission system of the above configuration, when the light of required wavelengths is dropped or added in the upstream side optical multiplexing/demultiplexing unit 10, the number of wavelengths of the WDM signal light to be input to the latter stage optical amplifying unit 30 is changed. In the optical amplifying unit 30, since the gain of the optical amplifier 31 is controlled so that the signal output level per one wavelength of the WDM signal light is held constant, if the number of wavelengths of the WDM signal light to be input to the optical amplifying unit 30 is changed, the total output power of the WDM signal light output from the optical amplifying unit 30 is varied according to such a change.

Therefore, in the present embodiment, in the wavelength numbers detecting section 12 in the optical multiplexing/demultiplexing unit 10, the number of wavelengths of the WDM signal light output from the multiplexing/demultiplexing section 11 is detected and the wavelength numbers information thereof is transmitted to the OSC transmitter 34. A detecting time of the number of wavelengths at this time does not constrain a speed of the automatic level control in the downstream side optical amplifying unit 50, even if a certain amount of time is required for the detection similarly to a conventional technology. Further, in the signal output monitor 32 in the upstream side optical amplifying unit 30, the total output power of the optical amplifier 31 is monitored and the monitoring result thereof is transmitted as the signal output level information to the OSC transmitter 34 via the control circuit 33. As a result, the supervisory control light containing the wavelength numbers information and signal output level information of the WDM signal light to be output from the upstream side optical amplifying unit 30 is generated by the OSC transmitter 34, and this supervisory control light is multiplexed with the WDM signal light by the multiplexer 35, to be sent out to the transmission path fiber 1.

The WDM signal light and the supervisory control light, which are sent out to the transmission path fiber 1, are propagated through the transmission path fiber 1 while being attenuated, to reach the downstream side optical amplifying unit 50. The WDM signal light and the supervisory control light, which are input to the optical amplifying unit 50, are demultiplexed by the demultiplexer 52, so that the WDM signal light is sent to the optical amplifier 51 while the supervisory control light being sent to the OSC receiver 55. Then, the total input power of the WDM signal light to be input to the optical amplifier 51 is monitored by the signal input monitor 53, and also, the total output power of the WDM signal light output from the optical amplifier 51 is monitored by the signal output monitor 54, so that the monitoring results thereof are transmitted to the control circuit 56 as the signal input level information and the signal output level information. Further, simultaneously with this, the wavelength numbers information and the signal output level information, which are contained in the supervisory control light, are acquired by the OSC receiver 55, to be transmitted to the control circuit 56.

In the control circuit 56, a current span loss $SL_{NOW}$ [dB] of the transmission path fiber 1 is calculated in accordance with a relation shown in the next formula (1), using the total output power $P_{OUT(T)}$ [dBm] of the WDM signal light in the upstream side optical amplifying unit 30, which is obtained based on the signal output level information from the OSC receiver 55, and the total input power $P_{IN(R)}$ [dBm] of the WDM signal light in the downstream optical amplifying unit 50, which is obtained based on the signal input level information from the signal input monitor 53.

$$SL_{NOW}=P_{OUT(T)}-P_{IN(R)} \quad (1)$$

Then, a variation amount $\Delta SL$ of the current span loss $SL_{NOW}$ to a span loss $SL_{INI}$ acquired at the system starting-up time is obtained using the next formula (2).

$$\Delta SL=SL_{NOW}-SL_{INI} \quad (2)$$

A gain G [dB] to be set for the optical amplifier 51 is calculated in accordance with a relation shown in the next formula (3).

$$G=SL_{INI}+\Delta SL+A+B \quad (3)$$

In the above formula, A is a correction value [dB] calculated using the wavelength numbers information, which is calculated in accordance with the process shown in the following. Further, B is a constant [dB].

For the calculation of the above correction value A, firstly, a target value $P_{OUT(R)\text{-}TAR}$ [dBm] of the total output power of the WDM signal light output from the optical amplifier 51 is computed in accordance with a relation shown in the next formula (4), using the wavelength numbers n of the WDM signal light, which is obtained based on the wavelength numbers information from the OSC receiver 55.

$$P_{OUT(R)\text{-}TAR}=10\cdot\log(n\cdot p_{OUT(R)\text{-}TAR}) \quad (4)$$

In the above formula, $P_{OUT(R)\text{-}TAR}$ is a target value [mW] of the signal output level per one wavelength in the optical amplifier 51.

Then, an actual measurement value $P_{OUT(R)}$ [dBm] of the total output power of the optical amplifier 51, which is obtained based on the signal output level information from the signal output monitor 54, is compared with the target value $P_{OUT(R)\text{-}TAR}$ of the total output power, and a difference therebetween is set as the correction value A in the above formula (3). Namely, the correction value A is computed in accordance with the next formula (5).

$$A=P_{OUT(R)\text{-}TAR}-P_{OUT(R)} \quad (5)$$

Incidentally, the computation of the gain G by the formulas (1) to (3) is performed in cycles of millisecond order, similarly to the conventional automatic level control by the span loss monitoring. On the other hand, the computation of the correction value A in accordance with the formulas (4) and (5) is performed in cycles (for example, about 100 ms) sufficiently longer than the detecting time of the number of wavelengths in the wavelength numbers detecting section 12. For the computation of the gain G which is repetitively performed during one computation cycle of the correction value A, the correction value A retaining the last computation result is used.

Since the gain G calculated as in the above manner is set for the optical amplifier 51, even if an error occurs in the monitor value of the span loss, a setting error of the gain G due to such an error in the monitor value is compensated with the correction value A computed using the wavelength numbers information. Therefore, the automatic level control which reduces an influence by the measurement error of the span loss is performed on the optical amplifier 51 while realizing the high-speed control speed of millisecond order. In such an automatic level control, the correction value A is determined according to the difference between the actual measurement value of the total output power of the optical amplifier 51 and the target value of the total output power thereof obtained by multiplying the signal output level per one wavelength with the number of wavelengths, and therefore, even in the case where the optical amplifying units are connected in multi-stages on the WDM optical transmission system, it is possible to avoid that the error of the signal output level is accumulated to be expanded.

As described in the above, according to the WDM optical transmission system of the first embodiment, even if the span loss in the transmission path fiber 1 or the number of wavelengths of the WDM signal light is varied, it is possible to perform the automatic level control on the optical amplifiers on the system at a high-speed and with high precision. Thus, it becomes possible to achieve the improvement of the signal reception sensitivity in the WDM optical transmission system.

Incidentally, in the first embodiment, there has been shown one example in which, when the correction value A is computed utilizing the wavelength numbers information, the difference between the actual measurement value of the total output power of the optical amplifier 51 and the target value thereof is set as the correction value A. However, the present invention is not limited thereto, and for example, a difference between an actual measurement value of the total input power of the optical amplifier 51 and a target value thereof may be set as the correction value A.

To be specific, in the control circuit 56, using the wavelength numbers n of the WDM signal light, which is obtained based on the wavelength numbers information from the OSC receiver 55, and the span loss SL calculated in accordance with the formula (1), the target value $P_{IN(R)-TAR}$ [dBm] of the total input power of the WDM signal light to be input to the optical amplifier 51 is computed in accordance with the next formula (4)'.

$$P_{IN(R)-TAR} = 10 \cdot \log(n \cdot p_{OUT(T)-TAR}) - SL \quad (4)'$$

In the above formula, $p_{OUT(T)-TAR}$ is the target value [mW] of the signal output level per one wavelength in the upstream side optical amplifier 31.

Then, the actual measurement value $P_{IN(R)}$ [dBm] of the total input power of the optical amplifier 51, which is obtained by the signal input level information from the signal input monitor 53, is compared with the target value $P_{IN(R)-TAR}$ of the total input power thereof, and a difference therebetween is set as the correction value A in the above formula (3). Namely, the correction value A is computed in accordance with the next formula (5)'.

$$A = P_{IN(R)-TAR} - P_{IN(R)} \quad (5)'$$

Next, there will be described a second embodiment of the present invention.

In the system configuration of the first embodiment shown in FIG. 1, in the case where the number of wavelengths of the WDM signal light which is sent from the upstream side optical amplifying unit 30 to the downstream side optical amplifying unit 50 becomes 0 wave, resulting in the wavelength discontinuity, it becomes difficult to monitor the span loss in the transmission path fiber 1. The reason of this is such that, as shown in the above formula (1), although the span loss SL is calculated using the total output power $P_{OUT(T)}$ of the upstream side optical amplifying unit 30, which is obtained based on the signal output level information from the OSC receiver 55, and the total input power $P_{IN(R)}$ of the downstream side optical amplifying unit 50, which is obtained based on the signal input level information from the signal input monitor 53, if there occurs the wavelength discontinuity wavelengths in the WDM signal light input to the downstream side optical amplifying unit 50, the measurement of the total input power $P_{IN(R)}$ cannot be performed in the signal input monitor 53.

When the wavelength discontinuity as described above occurs in the WDM signal light, the normal control is not performed unless the control method for the optical amplifier is properly switched, and also, in some cases, there is a possibility that the gain of the downstream side optical amplifier is set at an abnormal value so that the transmission quality of the WDM signal light is degraded when the transmission of the WDM signal light is restored (the number of wavelengths is one or more).

Therefore, in the second embodiment, there will be described an application example in which the optical amplifier can be normally controlled even when the wavelength discontinuity occurs in the WDM signal light.

Figure 2:
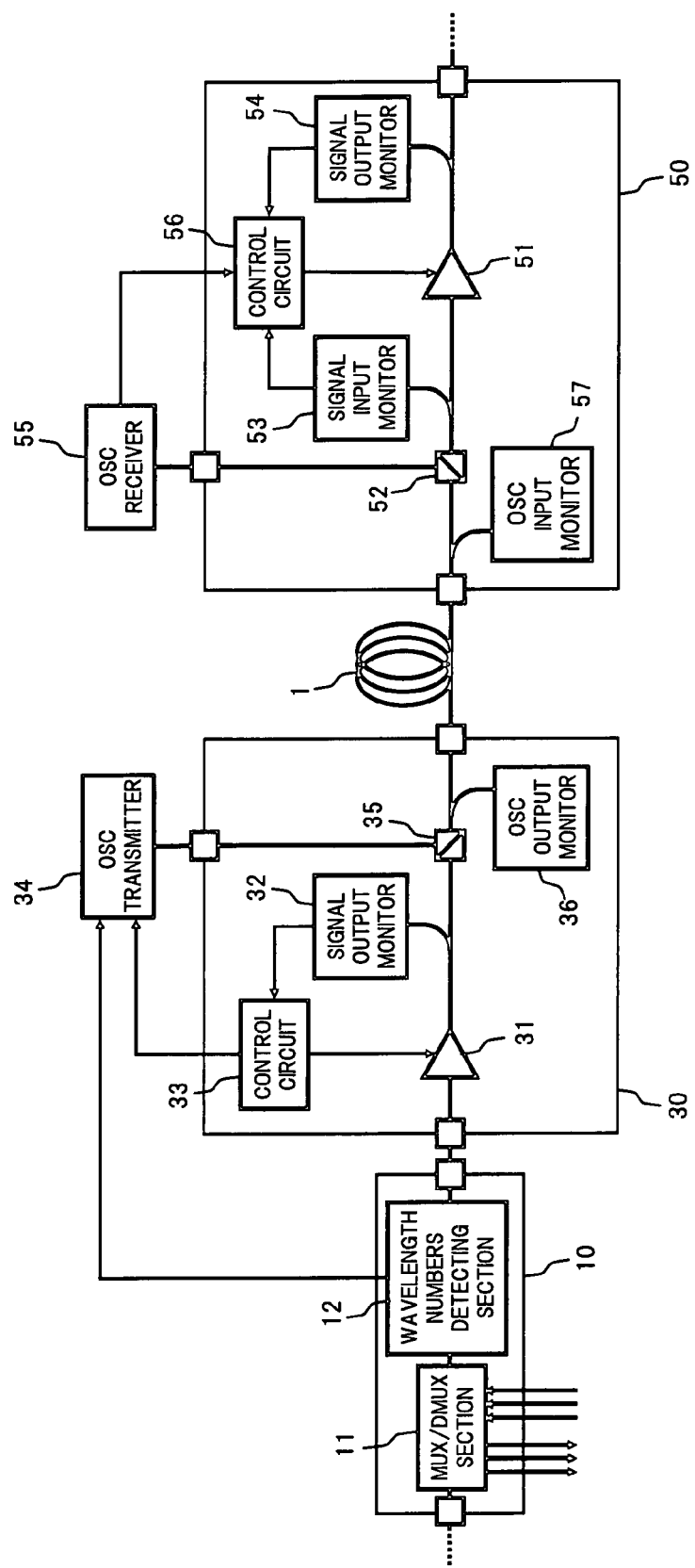
FIG. 2 is a diagram showing a configuration of an essential part of the WDM optical transmission system according to a second embodiment of the present invention.

FIG. 2 is a block diagram showing a configuration of an essential part of the WDM optical transmission system using optical amplifiers according to the second embodiment of the present invention.

In FIG. 2, the configuration of the WDM optical transmission system of the present embodiment differs from that of the first embodiment shown in FIG. 1 in that an OSC output monitor 36 is disposed on the latter stage of the multiplexer 35 in the upstream side optical amplifying unit 30, and also, an OSC input monitor 57 is disposed on the former stage of the demultiplexer 52 in the downstream side optical amplifying unit 50. Incidentally, the configuration of the present embodiment other than the above is similar to that of the first embodiment, and therefore, the description thereof is omitted here.

The OSC output monitor 36 monitors an output level of the supervisory control light to be sent out from the optical amplifying unit 30 to the transmission path fiber 1. A monitoring result of the OSC output monitor 36 is transmitted to the OSC transmitter 34 although an arrow line thereof is omitted in FIG. 2. The OSC transmitter 34 generates a supervisory control light which contains OSC output level information transmitted from the OSC transmitter 36 in addition to the wavelength numbers information and the signal output level information.

The OSC input monitor 57 monitors an input level of the supervisory control light which is propagated through the transmission path fiber 1 to be input to the optical amplifying unit 50. A monitoring result of the OSC input monitor 57 is transmitted to the control circuit 56 although an arrow line thereof is omitted in FIG. 2, to be used for the calculation of the span loss at the time when the wavelength discontinuity occurs in the WDM signal light.

In the WDM optical transmission system of the above configuration, in the case where the number of wavelengths of the WDM signal light transmitted from the upstream side optical amplifying unit 30 to the downstream side optical amplifying unit 50 is one or more waves, similarly to the first embodiment, the automatic level control for the optical amplifier 51 is performed in accordance with the gain G which is obtained by compensating the measurement error of the span loss with the correction value A computed using the wavelength numbers information.

Then, if the total input power of the WDM signal light monitored by the signal input monitor 53 in the downstream side optical amplifying unit 50 is reduced to be lower than a level equivalent to one wave, and it is judged that the wavelength discontinuity occurred in the WDM signal light, the variation amount ΔSL of the span loss and the correction value A, which are calculated immediately before the detection of wavelength discontinuity, are stored in a memory (not shown in the figure) in the control circuit 56.

In general, since the supervisory control light is often communicated even when the wavelength discontinuity occurs, during a period of time from the occurrence of wavelength discontinuity until the wavelength discontinuity recovery, the variation amount of the span loss is monitored based on the OSC output level information in the upstream side optical amplifying unit 30 and the OSC input level information in the downstream side optical amplifying unit 50. To be specific, in the control circuit 56 in the downstream side optical amplifying unit 50, a variation amount $\Delta SL_{OSC}$ of the span loss during the occurrence of wavelength discontinuity is calculated in accordance with the next formula (6), using an OSC output level $P_{OSC-OUT(T)}$ [dBm] in the upstream side optical amplifying unit 30, which is transmitted from the OSC receiver 55, and an OSC input level $P_{OSC-IN(R)}$ [dBm] in the downstream side optical amplifying unit 50, which is transmitted from the OSC input monitor 57.

$$\Delta SL_{OSC} = SL_{OSC} - SL_{INI} = P_{OSC\text{-}OUT(T)} - P_{OSC\text{-}IN(R)} - SL_{INI} \quad (6)$$

Further, the variation amount $\Delta SL_{OSC}$ of the span loss during the occurrence of wavelength discontinuity is reflected to the variation amount $\Delta SL_{MEM}$ of the span loss immediately before the detection of wavelength discontinuity, which is stored in the memory, so that a variation amount $\Delta SL_{NOW}$ of the current span loss is computed in accordance with the next formula (7).

$$\Delta SL_{NOW} = \Delta SL_{MEM} + \Delta SL_{OSC} \quad (7)$$

Then, by using the variation amount $\Delta SL_{NOW}$ of the current span loss as $\Delta SL$ in the above formula (3) and also, using the value immediately before the detection of wavelength discontinuity, which is stored in the memory, as the correction amount A in the formula (3), the gain G at the occurrence time of the wavelength discontinuity is calculated, so that the automatic level control for the optical amplifier 51 is performed in accordance with the gain G.

Incidentally, a series of computation at the occurrence time of wavelength discontinuity is performed in cycles of millisecond order.

As described in the above, according to the WDM optical transmission system of the second embodiment, even when the wavelength discontinuity occurs in the WDM signal light, by monitoring the variation amount of the span loss using the upstream side OSC output level and the downstream side OSC input level, the automatic gain control for the optical amplifier 51 can be normally performed. Therefore, it becomes possible to maintain excellently the transmission quality of the WDM signal light at the time when the wavelength discontinuity is recovered.

Figure 3:
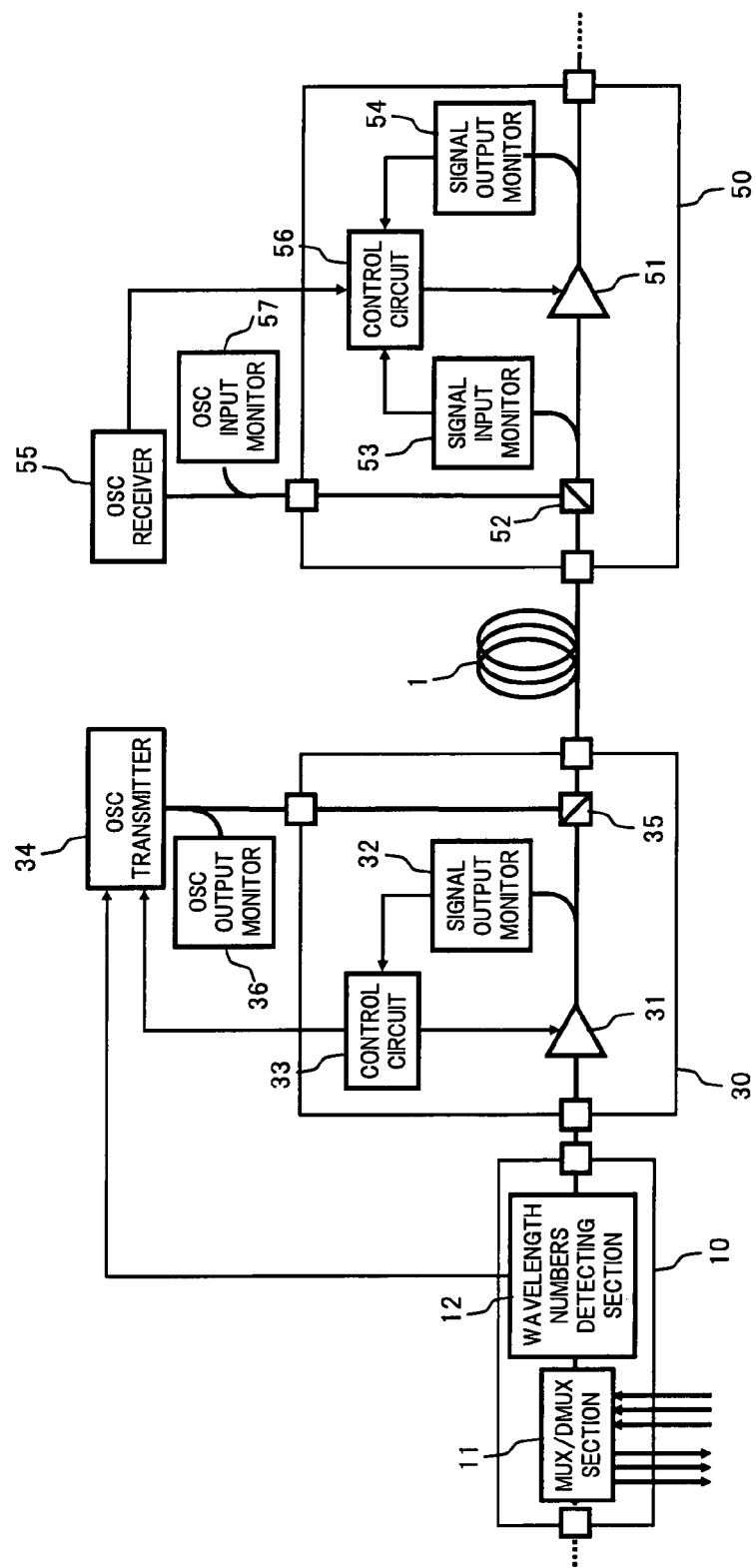
FIG. 3 is a block diagram showing another configuration example relating to the second embodiment.
Figure 4:
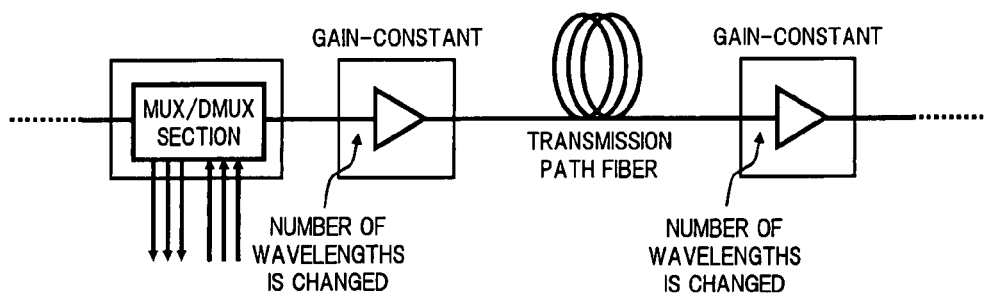
FIG. 4 is a diagram showing one example of a conventional WDM optical transmission system using an optical amplifier which is subjected to an automatic gain control.
Figure 5:
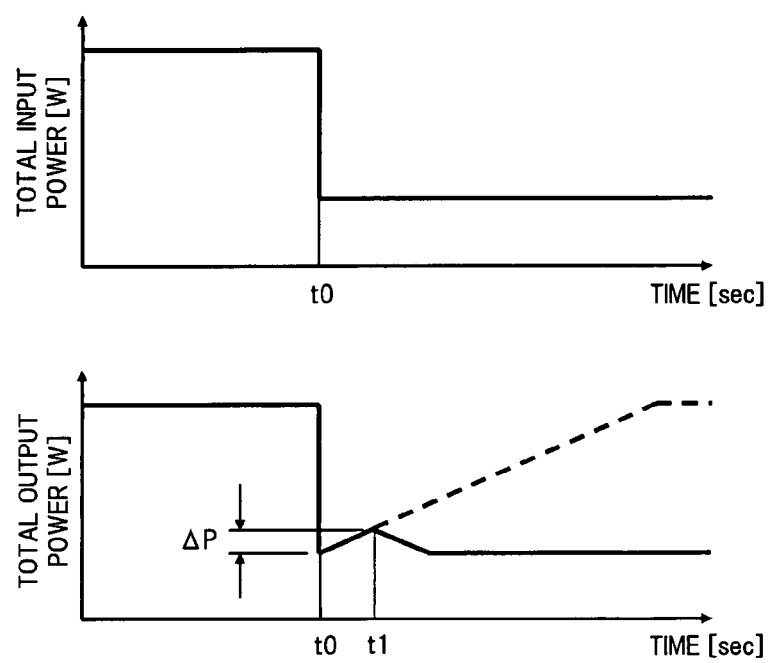
FIG. 5 is a graph explaining a problem in a conventional automatic level control using wavelength numbers information.
Figure 6:
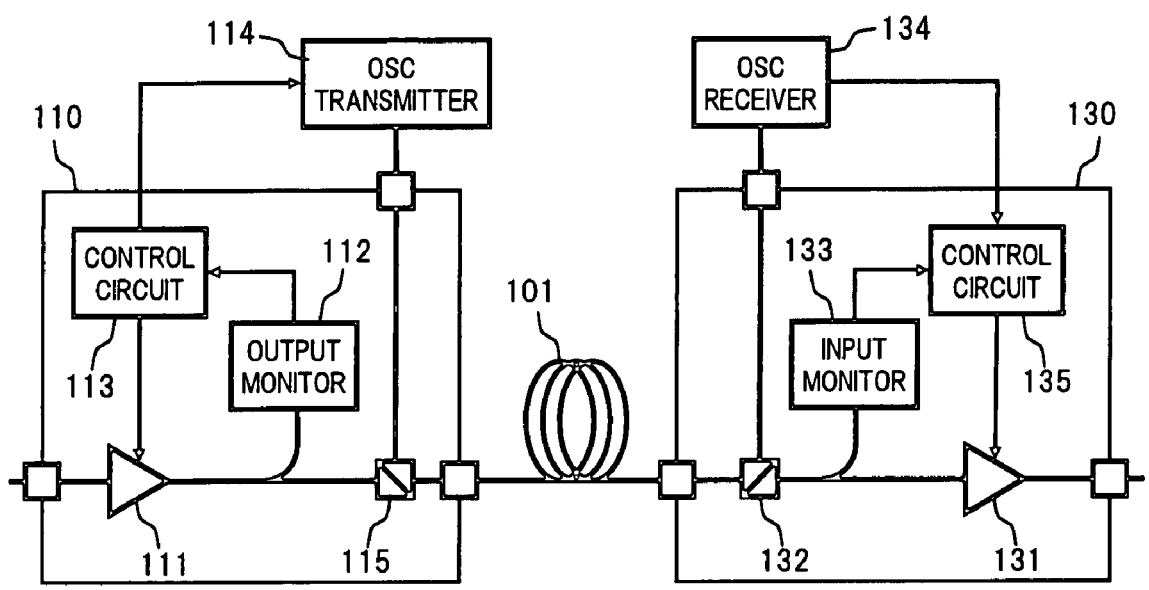
FIG. 6 is a diagram showing a configuration example of an essential part of a WDM optical transmission system to which a conventional automatic level control by the span loss monitoring is applied.
Figure 7:
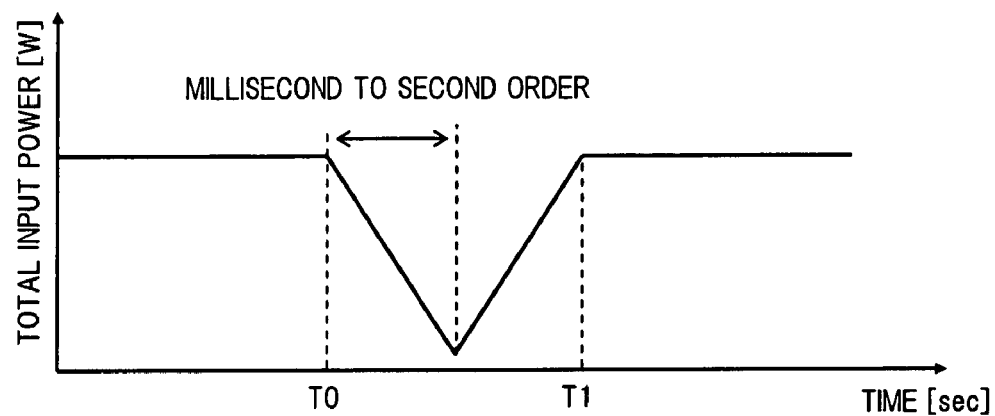
FIG. 7 is a graph in which signal waveforms in conventional automatic level controls are compared with each other.
Figure 7:
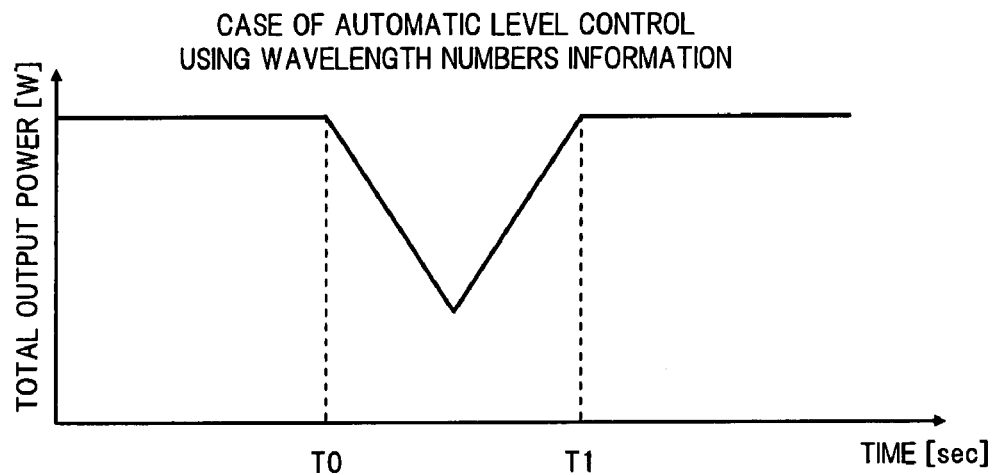
Figure 7:
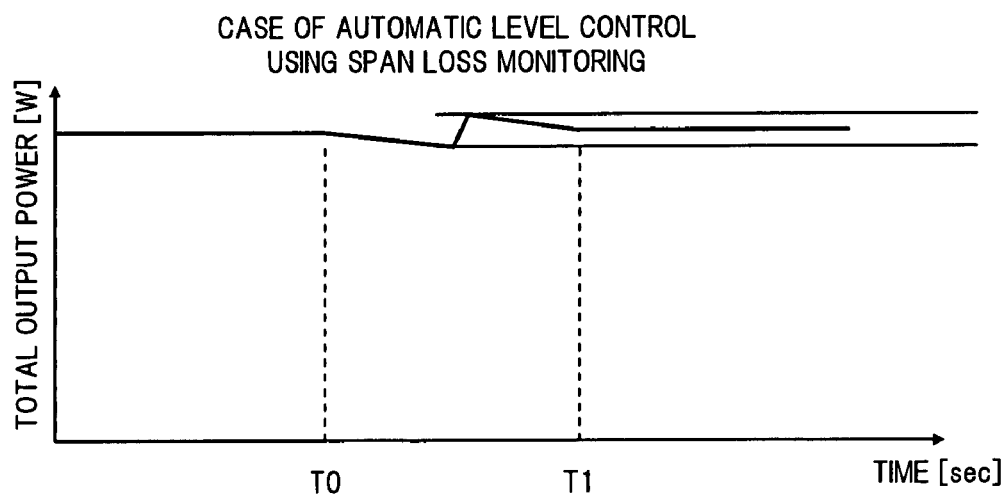
Figure 8:
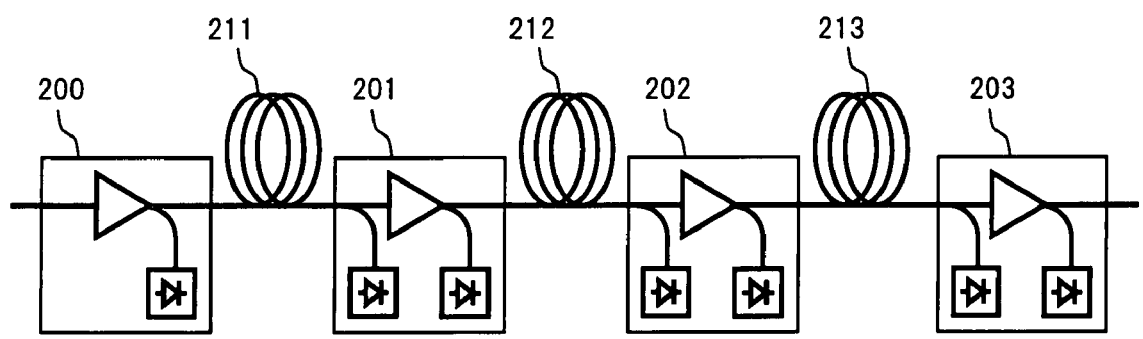
FIG. 8 is a diagram explaining a problem in the conventional automatic level control by the span loss monitoring.

Incidentally, in the second embodiment, the OSC output monitor 36 is disposed on the latter stage of the multiplexer 35 in the upstream side optical amplifying unit 30 and the OSC input monitor 57 is disposed on the former stage of the demultiplexer 52 in the downstream side optical amplifying unit 50. However, the arrangement of the OSC output monitor 36 and the OSC input monitor 57 is not limited to the above described one example, and as shown in FIG. 3 for example, the configuration may be such that the OSC output monitor 36 is arranged on an output end of the OSC transmitter 34 and the OSC input monitor 57 is arranged on an input end of the OSC receiver 55.

Further, in the second embodiment, it is provided that the supervisory control light is communicated even when the wavelength discontinuity occurs in the WDM signal light. However, there is also a possibility that the supervisory control light is interrupted due to a failure or the like of the OSC transmitter 34 for example. In such a situation where the supervisory control light is also interrupted during the occurrence of wavelength discontinuity in the WDM signal light, since it is difficult to monitor the span loss, it is desirable that the automatic level control is suspended to be switched to the automatic gain control, so that the influence on the transmission quality of the WDM signal light at the recovery time of the wavelength discontinuity is suppressed at minimum.

What is claimed is:

1. A WDM optical transmission system which includes:
a first optical amplifying section that amplifies a wavelength division multiplexed (WDM) signal light in which a plurality of optical signals of different wavelengths are multiplexed;

an optical transmission path to which the WDM signal light amplified by said first optical amplifying section is input at one end thereof; and a second optical amplifying section that amplifies the WDM signal light output from the other end of said optical transmission path, comprising;

a wavelength numbers detecting section that detects the number of wavelengths of the WDM signal light input to said first optical amplifying section, to create wavelength numbers information, wherein said first optical amplifying section includes:

a first optical amplifier which amplifies the WDM signal light input thereto;

a first signal output monitor which detects the total power of the WDM signal light output from said first optical amplifier, to create first signal output level information;

a supervisory control light transmitter which transmits a supervisory control light containing the wavelength numbers information created by said wavelength numbers detecting section and the first signal output level information created by said first signal output monitor; and a multiplexer which multiplexes the WDM signal light amplified by said first optical amplifier with the supervisory control light transmitted from said supervisory control light transmitter, to feed the multiplexed light to the one end of said optical transmission path, and said second optical amplifying section includes:

a demultiplexer which demultiplexes the light output from the other end of said optical transmission path into the WDM signal light and the supervisory control light;

a second optical amplifier which amplifies the WDM light demultiplexed by said demultiplexer;

a signal input monitor which detects the total power of the WDM signal light input to said second optical amplifier, to create signal input level information;

a second signal output monitor which detects the total power of the WDM signal light output from said second optical amplifier, to create second signal output level information;

a supervisory control light receiver which receives the supervisory control light demultiplexed by said demultiplexer, to acquire said wavelength numbers information and said first signal output level information; and a control circuit which computes a loss in said optical transmission path using the first signal output level information acquired in said supervisory control light receiver and the signal input level information created by said signal input monitor, to calculate a gain to be set for said second optical amplifier based on the computed loss, and also computes a target signal output level of said second optical amplifier using the wavelength numbers information acquired in said supervisory control light receiver, to correct said computed gain using a difference between said target signal output level and the second signal output level information created by said second signal output monitor as a correction value, to thereby control said second optical amplifier in accordance with the corrected gain.

2. A WDM optical transmission system according to claim 1, wherein said control circuit calculates a target signal input level of said second optical amplifier, using the wavelength numbers information acquired in said supervisory control light receiver and said computed loss in the optical transmission path, and sets, as said correction value, a difference between said target signal input level and the signal input level information created by said signal input monitor.

3. A WDM optical transmission system according to claim 1,
wherein said control circuit suspends the computation of the loss in said optical transmission when it is judged based on a monitoring result of said signal input monitor that the number of wavelengths of the WDM signal light is 0, to perform an automatic gain control on said second optical amplifier.

4. A WDM optical transmission system according to claim 1,
wherein said first optical amplifying section includes
a supervisory control light output monitor which detects the power of the supervisory control light to be output toward the one end of said optical transmission path, to create supervisory control light output level information, and
said supervisory control light transmitter transmits a supervisory control light containing the wavelength numbers information created by said wavelength numbers information detecting section, the first signal output level information created by said first signal output monitor and the supervisory control light output level information created by said supervisory control light output monitor;
said second optical amplifying section includes
a supervisory control light input monitor which detects the power of the supervisory control light input from the other end of said optical transmission path, to create supervisory control light input level information, and
said supervisory control light receiver receives the supervisory control light demultiplexed by said demultiplexer, to acquire said wavelength numbers information, said first signal output level information and said supervisory control light output level information; and
said control circuit computes the loss in said optical transmission path using the supervisory control light output level information acquired by said supervisory control light receiver and the supervisory control light input level information created by said supervisory control light input monitor, when it is judged based on a monitoring result of said signal input monitor that the number of wavelengths of the WDM signal light is 0.

5. A WDM optical transmission system according to claim 4,
wherein said supervisory control light output monitor detects the power of the supervisory control light to be sent to the one end of said optical transmission path from said multiplexer, and
said supervisory control light input monitor detects the power of the supervisory control light to be sent to said demultiplexer from the other end of said optical transmission path.

6. A WDM optical transmission system according to claim 4,
wherein said supervisory control light output monitor detects the power of the supervisory control light to be sent to said multiplexer from said supervisory control light transmitter, and
said supervisory control light input monitor detects the power of the supervisory control light to be sent to said supervisory control light receiver from said demultiplexer.

7. A WDM optical transmission system according to claim 4,
wherein said control circuit in said second optical amplifying section suspends the computation of the loss in said optical transmission path when it is judged that the supervisory control light is interrupted, to perform an automatic gain control on said second optical amplifier.

8. An optical amplifying apparatus which includes an optical amplifying section that amplifies a wavelength division multiplexed signal light which is input thereto from an optical transmission apparatus via an optical transmission path, comprising:
a supervisory control light receiving section that receives a supervisory control light containing wavelength numbers information of said wavelength division multiplexed signal light and first signal output level information indicating an optical power level of said wavelength division multiplexed signal light output by said optical transmission apparatus;
a first optical detecting section that detects the optical power level of said input wavelength division multiplexed signal light, to output a detection result as signal input level information;
a second optical detecting section that detects the optical power level of said wavelength division multiplexed signal light amplified by said optical amplifying section, to output a detection result as second signal output level information;
a control circuit that computes a loss in said optical transmission path using said first signal output level information and said signal input level information to calculate a gain to be set for said optical amplifying section based on the computed loss, and also computes a target signal output level of said optical amplifying section using said wavelength numbers information to correct said computed gain using a difference between said target signal output level and said second signal output level information as a correction value, to thereby control said optical amplifying section in accordance with the corrected gain; and
a third optical detecting section that detects an optical power level of the supervisory control light input from said optical transmission path, to output a detection result as supervisory control light input level information,
wherein said supervisory control light receiving section receives a supervisory control light containing said wavelength numbers information, said first signal output level information and supervisory control light output level information indicating the power of the supervisory control light output by said optical transmission apparatus, and
said control circuit computes the loss in said optical transmission path using said supervisory control light output level information and said supervisory control light input level information, when it is judged based on a detection result of said first optical detecting section that the number of wavelengths of the WDM signal light is 0.

9. An optical amplifying apparatus according to claim 8,
wherein said control circuit calculates a target signal input level of said optical amplifying section, using said wavelength numbers information and said computed loss in the optical transmission path, and sets, as said correction value, a difference between said target signal input level and said signal input level information.

10. An optical amplifying apparatus according to claim 8,
wherein said control circuit suspends the computation of the loss in said optical transmission path when it is judged that the supervisory control light is interrupted, to perform an automatic gain control on said optical amplifying section.

* * * * *